(12) United States Patent
Hummel

(10) Patent No.: US 11,117,459 B2
(45) Date of Patent: Sep. 14, 2021

(54) HYBRID DRIVETRAIN FOR A HYBRID MOTOR VEHICLE

(71) Applicant: AUDI AG, Ingolstadt (DE)

(72) Inventor: Steffen Hummel, Flacht (DE)

(73) Assignee: AUDI AG, Ingolstadt (DE)

( * ) Notice: Subject to any disclaimer, the term of this patent is extended or adjusted under 35 U.S.C. 154(b) by 16 days.

(21) Appl. No.: 16/630,932

(22) PCT Filed: Sep. 5, 2018

(86) PCT No.: PCT/EP2018/073853
§ 371 (c)(1),
(2) Date: Jan. 14, 2020

(87) PCT Pub. No.: WO2019/048469
PCT Pub. Date: Mar. 14, 2019

(65) Prior Publication Data
US 2020/0231030 A1 Jul. 23, 2020

(30) Foreign Application Priority Data

Sep. 6, 2017 (DE) ...................... 10 2017 215 674.0

(51) Int. Cl.
*B60K 6/387* (2007.10)
*B60K 6/547* (2007.10)
(Continued)

(52) U.S. Cl.
CPC .............. *B60K 6/365* (2013.01); *B60K 6/387* (2013.01); *B60K 6/547* (2013.01); *F16H 3/006* (2013.01);
(Continued)

(58) Field of Classification Search
CPC ........ B60K 6/365; B60K 6/387; B60K 6/547; B60K 2006/4808; B60K 2006/4825;
(Continued)

(56) References Cited

U.S. PATENT DOCUMENTS 8,608,615 B2 * 12/2013 Fuechtner ................ B60K 6/48
477/3
10,882,387 B2 * 1/2021 Hummel .................. B60K 6/48
(Continued)

FOREIGN PATENT DOCUMENTS

DE 10 2004 042 007 A1 3/2006
DE 10 2010 008 754 A1 8/2011
(Continued)

OTHER PUBLICATIONS

Machine translation of DE102015208756A filed Apr. 10, 2021. (Year: 2021).*
(Continued)

*Primary Examiner* — Tisha D Lewis
(74) *Attorney, Agent, or Firm* — Maier & Maier, PLLC

(57) ABSTRACT

A hybrid drivetrain for a hybrid-drive vehicle, including an electric motor and an internal combustion engine, the force output shaft of which alternatingly acts either on a first input shaft or on a coaxial second input shaft of a dual clutch transmission via two separating clutches of a dual clutch, wherein a respective first and second sub-transmission can be activated using the input shafts, and wherein fixed and idler gears are arranged in wheel planes on the two input shafts and a common axially parallel output shaft and are combined into gear sets which form gear stages.

15 Claims, 4 Drawing Sheets

(51) Int. Cl.
*F16H 3/06* (2006.01)
*B60K 6/365* (2007.10)
*F16H 3/00* (2006.01)
*F16H 3/72* (2006.01)
*F16H 37/06* (2006.01)
*B60K 6/48* (2007.10)

(52) U.S. Cl.
CPC ........... *F16H 3/724* (2013.01); *F16H 37/065* (2013.01); *B60K 2006/4808* (2013.01); *B60K 2006/4825* (2013.01); *B60Y 2200/92* (2013.01); *F16H 2200/0056* (2013.01)

(58) Field of Classification Search
CPC ........ F16H 3/006; F16H 3/724; F16H 37/065; F16H 2200/0056; B60Y 2200/92
See application file for complete search history.

(56) References Cited

U.S. PATENT DOCUMENTS

| | | |
|---|---|---|
| 2014/0171259 A1 | 6/2014 | Genise |
| 2016/0082822 A1* | 3/2016 | Huh ....................... B60K 6/547 74/665 R |
| 2016/0167503 A1* | 6/2016 | Lee .......................... B60K 6/48 475/5 |

FOREIGN PATENT DOCUMENTS

| | | |
|---|---|---|
| DE | 10 2012 203 365 A1 | 9/2013 |
| DE | 10 2012 219 125 A1 | 4/2014 |
| DE | 10 2014 110 221 A1 | 6/2015 |
| DE | 10 2014 223 339 A1 | 5/2016 |
| DE | 10 2015 201 458 A1 | 8/2016 |
| DE | 10 2015 208 756 A1 | 11/2016 |

OTHER PUBLICATIONS

Examination Report dated Jul. 17, 2018 in corresponding German application No. 10 2017 215 674.0; 14 pages including Machine-generated English-language translation.

International Search Report and Written Opinion of the International Searching Authority dated Nov. 21, 2018 in corresponding International application No. PCT/EP2018/073853; 32 pages including Machine-generated English-language translation.

English-language translation of International Preliminary Report on Patentability dated Mar. 19, 2020, in corresponding International Application No. PCT/EP2018/073853; 10 pages.

* cited by examiner

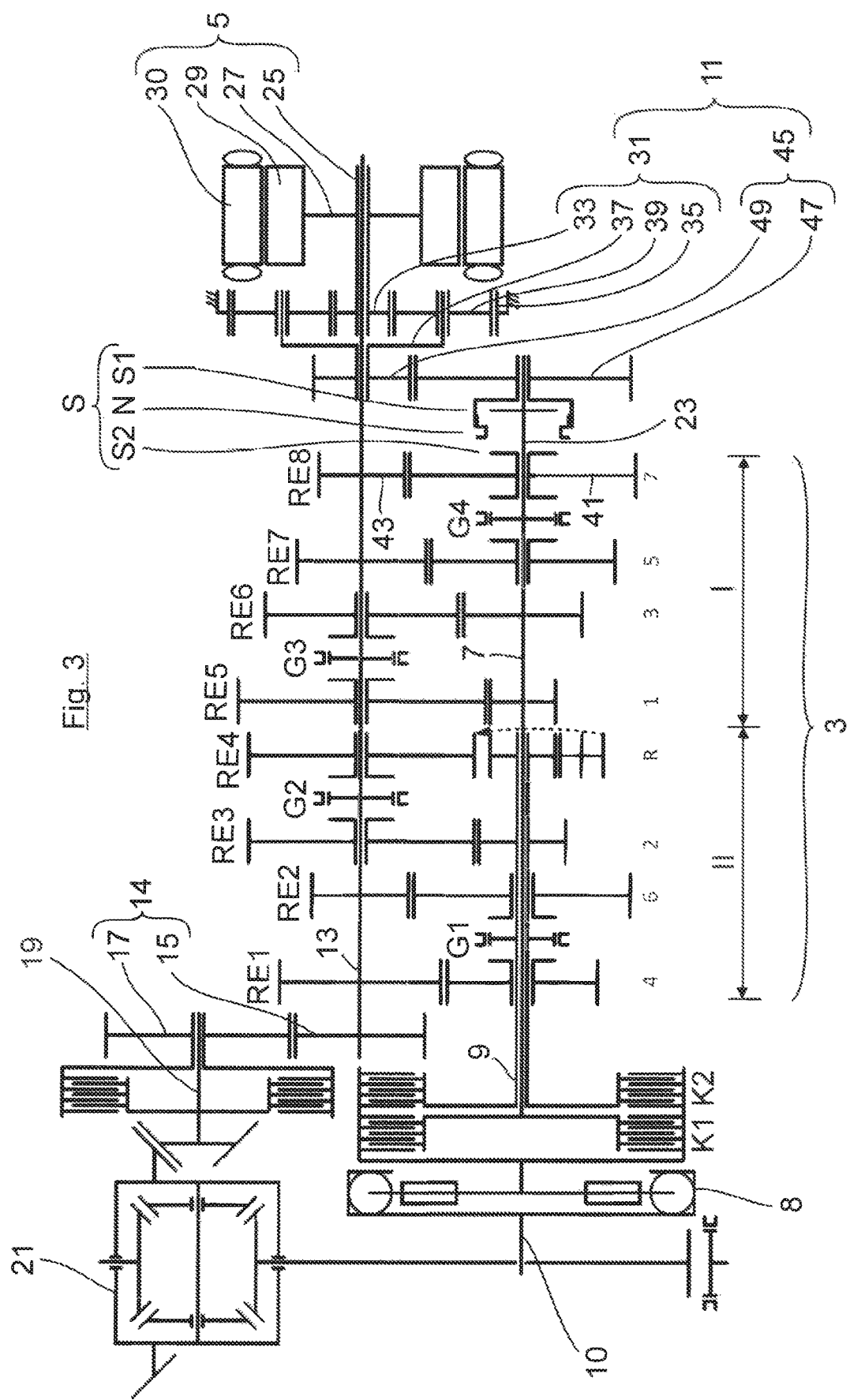

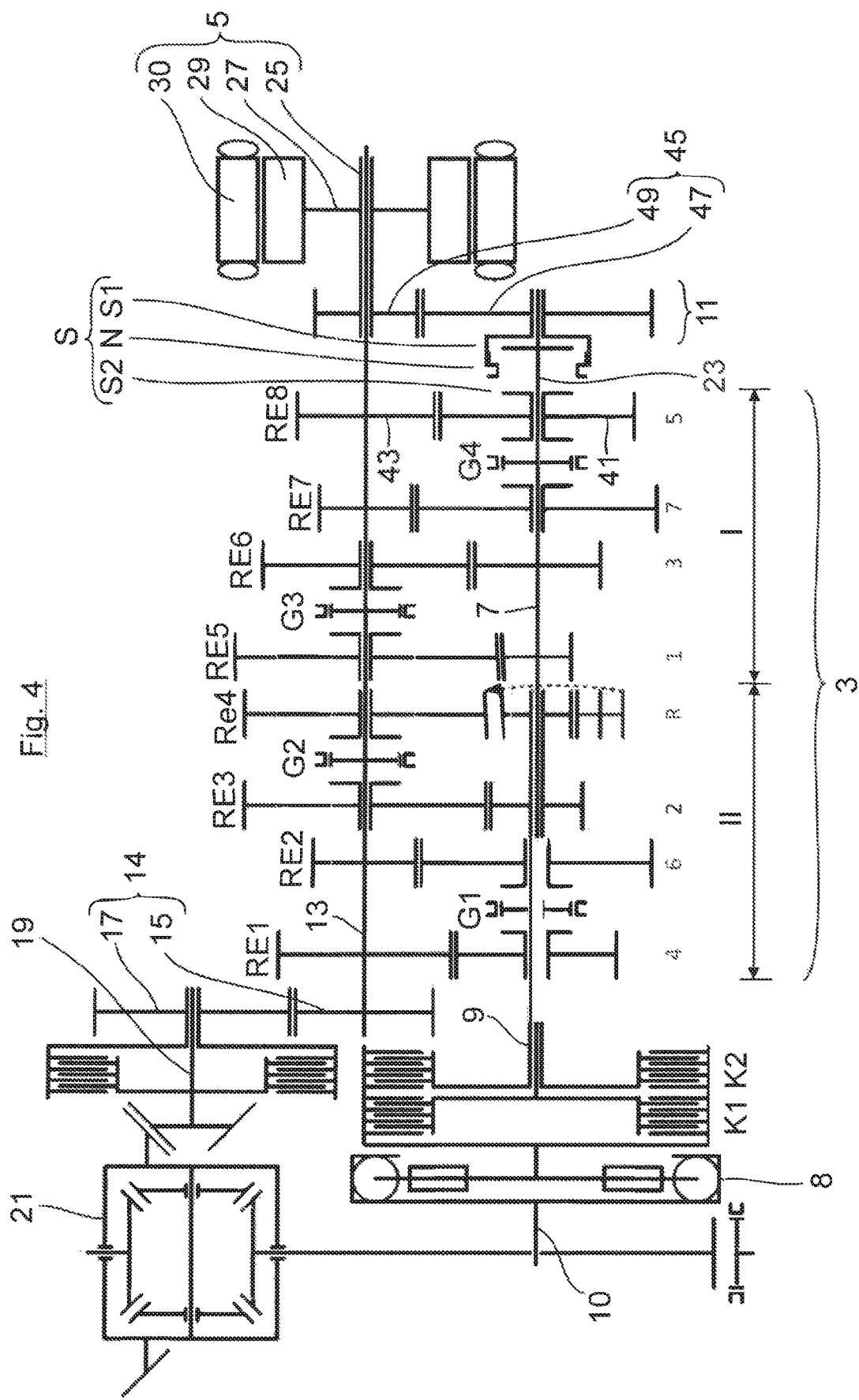

HYBRID DRIVETRAIN FOR A HYBRID MOTOR VEHICLE

FIELD

The present invention relates to a hybrid drivetrain for a hybrid-drive motor vehicle.

BACKGROUND

Such a hybrid drivetrain may have a drivetrain generator, for example a 48 V electric motor, which is designed for a purely electromotive driving mode as well as for recuperation. The recuperated energy may optionally be recoverable, for example for an electronic air-conditioning compressor, via the vehicle's electrical system.

DE 10 2012 203 365 A1 discloses a common hybrid drivetrain with an electric motor and an internal combustion engine. The force output shaft of said engine alternatingly acts, via two separating clutches, on a first input shaft and on a coaxial second input shaft of a dual clutch transmission, with which a respective sub-transmission can be activated. Fixed and idler gears are arranged in wheel planes on the two input shafts and a common axially parallel output shaft, said fixed and idler gears being combined into gear sets while forming gear stages. The idler gears can be coupled to the above shafts in the gear sets by means of shifting elements. The electric motor may act directly on one of the input shafts via an intermediate gear. In addition, an electric-motor-side shifting element is interposed between the electric motor and the cooperating input shaft (hereinafter designated as an electric-motor-side input shaft). In a first shifting position, the electric-motor-side shifting element couples the electric motor to the cooperating input shaft of the dual clutch transmission. In contrast, in a neutral position of the shifting element, the electric motor drivingly decouples the electric motor from the dual clutch transmission.

In addition, in DE 10 2012 203 365 A1, the dual clutch transmission has further shifting elements, with the aid of which the electric motor can be coupled to the second input shaft and/or to further intermediate gear shafts of the dual clutch transmission.

SUMMARY

The object of the invention is to provide a hybrid drivetrain, with which the electric motor can be coupled to the dual clutch transmission in a different manner that is structurally simpler and compact in terms of installation space as compared to the prior art.

The electric-motor-side shifting element not only couples the electric motor to the cooperating input shaft in a first shifting position but also decouples the electric motor from the dual clutch transmission in a neutral position. In addition, the electric-motor-side shifting element can also be shifted into a second shifting position, in which the electric motor is coupled to the output shaft and is simultaneously decoupled from the drive-side of the dual clutch transmission.

In this manner, the electric motor can be connected to the dual clutch transmission on the wheel side (i.e. to the output shaft on the drive side), on the drive side (i.e. to one of the input shafts of the dual clutch transmission), as well as to the dual clutch transmission in a completely decoupled manner, and thus with precisely only one shifting element in a manner that is structurally simple and compact in terms of installation space.

In one technical implementation, the intermediate gear of the electric motor may be a gear set separate from all gear stages, preferably a planetary gear stage and/or a spur gear stage. In doing so, the electric-motor-side shifting element may be arranged directly on the electric-motor-side input shaft. It is beneficial in terms of installation space when the electric-motor-side shifting element can be shifted into the first shifting element from its neutral position when viewed in the axial direction or can be shifted into the second shifting position, which is opposite thereto.

In a further technical implementation, a wheel plane (hereinafter designated as an electric-motor-side wheel plane), which forms a gear stage, may directly adjoin the electric-motor-side shifting element in the axial direction. Said wheel plane may have an idler gear mounted so as to pivot on the electric-motor-side input shaft. The idler gear of the electric-motor-side wheel plane is coupled to the electric-motor-side input shaft for a conventional gear change by means of a gear shifting element. In addition, an electric motor is also connected to the output shaft by means of the idler gear of the electric-motor-side wheel plane. In this case, the idler gear of the electric-motor-side wheel plane can be coupled to the electric motor by means of the electric-motor-side shifting element (which is in the second shifting position). In doing so, it is preferable in terms of a compact arrangement when the above gear shifting element and the electric-motor-side shifting element are positioned at axially opposite sides of the idler gear of the electric-motor-side wheel plane.

In the previously mentioned dual clutch transmission, the first sub-transmission and the second sub-transmission are preferably arranged next to one another in the axial direction. The first sub-transmission may be spaced apart from the dual clutch axially when the second sub-transmission is in the intermediate position. In this case, the first input shaft may be a solid input shaft, which extends coaxially within the second input shaft designed as a hollow input shaft. Preferably, all odd forward gears may be assigned to the first sub-transmission, while all even forward gears may be assigned to the second sub-transmission, with it being possible to shift said gears via corresponding shifting elements.

For example, the dual clutch transmission may be a known seven-speed transmission, in which, for example, the wheel plane arranged in the first sub-transmission acts as an electric-motor-side wheel plane for the seventh gear stage or for the fifth gear stage, with it being possible to couple said wheel plane to the intermediate gear of the electric motor.

The electric-motor-side shifting element may be arranged, in a manner beneficial in terms of installation space, between a wheel plane, which is external in the axial direction and which forms a gear stage (i.e. the electric-motor-side wheel plane), and the intermediate gear of the electric motor. In the above dual clutch transmission, all wheel planes may be arranged axially behind one another, wherein the dual clutch is arranged at an axially external transmission end and the electric motor, optionally including intermediate gear, may be arranged at an axially external transmission end which is opposite thereto.

With respect to an arrangement beneficial in terms of installation space, it is preferable when the electric motor with its electromotive shaft is arranged coaxially with respect to the electric-motor-side input shaft or coaxially with respect to the common output shaft of the dual clutch transmission. The electromotive shaft may be implemented as a hollow shaft, which is mounted coaxially on the electric-motor-side input shaft or on the common output shaft.

In a first design variant, the intermediate gear may have a planetary gear stage with a sun gear as well as with a radially external ring gear and intermediately arranged planetary gears.

In common use, the rotating rotor of the electric motor may be connected, in a rotationally fixed manner, to the electromotive shaft via a drive flange. Next to the drive flange, a sun gear of the intermediate planetary gear unit may also be arranged rotationally fixed on the electromotive shaft. In this case, the radially external ring gear of the planetary gear stage may be arranged affixed to the housing and the bar supporting the planetary gears may be coupled either to the electric-motor-side input shaft or to the output shaft by means of the electric-motor-side shifting element.

In a further embodiment, the electromotive shaft may not be mounted coaxially on the electric-motor-side input shaft but instead may be mounted coaxially on the common output shaft. In this case, the electromotive shaft may be actively connected to the electric-motor-side input shaft via the intermediate gear and via the electric-motor-side shifting element. In one technical implementation, the intermediate gear in this case may have a spur gear stage, the drive-side gear wheel of which is mounted so as to pivot as an idler gear on the electric-motor-side input shaft. With the aid of the electric-motor-side shifting element, the drive-side idler gear of the spur gear stage may either be coupled to the electric-motor-side input shaft or to the output shaft (via electric-motor-side wheel plane RE8).

In a further embodiment, the intermediate gear of the electric motor may have both the previously mentioned spur gear stage as well as the planetary gear stage. In this case, the bar of the planetary gear stage may be connected, in a rotationally fixed manner, to an output-side idler gear, which is mounted on the output shaft, of the spur gear stage.

Alternatively to this, the intermediate gear may exclusively have the spur gear stage (i.e. without the planetary gear stage). In this case, an output-side gear wheel of the spur gear stage may be arranged rotationally fixed as a fixed gear on the electromotive shaft (which is mounted on the output shaft).

BRIEF DESCRIPTION OF THE DRAWINGS

Exemplary embodiments of the invention are described in the following by means of the enclosed figures.

The following is shown:

FIG. 3 a respective view in accordance with FIG. 1 according to further exemplary embodiment of the invention;

FIG. 4 a respective view in accordance with FIG. 1 according to further exemplary embodiment of the invention.

DETAILED DESCRIPTION

Figure 1:
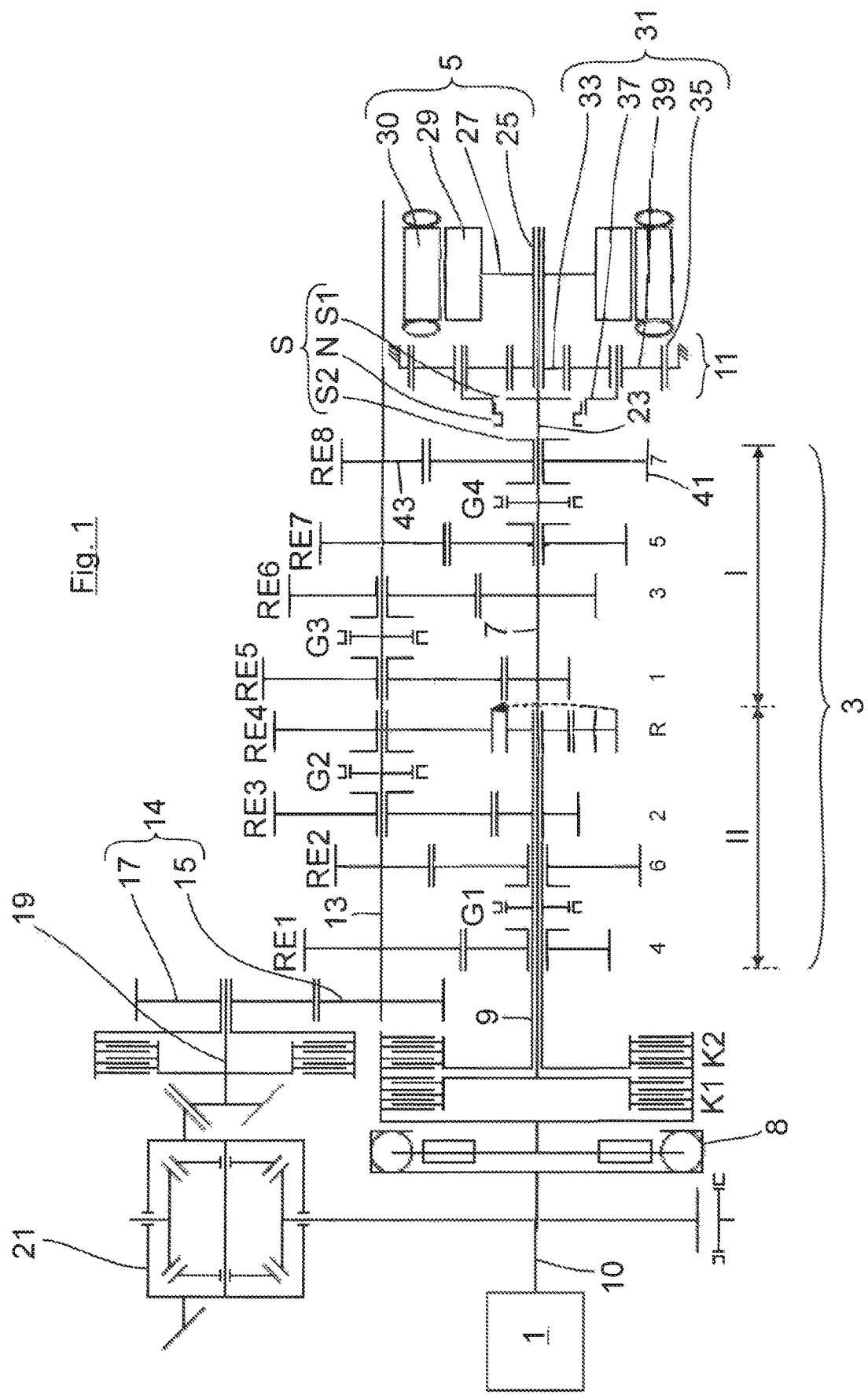
FIG. 1 a transmission structure of the dual clutch transmission according to a first exemplary embodiment.

FIG. 1 shows a hybrid drivetrain for a hybrid-drive vehicle, which substantially comprises an internal combustion engine 1, a dual clutch transmission 3, and an electric motor 5. The dual clutch transmission 3 has a first input shaft 7 and a second input shaft 9, which are arranged coaxially and which can be alternatingly connected to an internal combustion engine 10 in a torque-transferring manner via, for example, two hydraulically actuatable disc clutches K1, K2 by means of an upstream torsional vibration damper 8. The first input shaft 7 is implemented as a solid shaft in FIG. 1, which is guided coaxially within the second input shaft 9 implemented as a hollow shaft.

In FIG. 1, the dual clutch transmission 3 has, for example, a total of seven forward gears and one reverse gear. These gears are implemented in wheel planes RE1 to RE8 by means of corresponding gear sets, each with one idler gear and one fixed gear, which can be shifted in a known manner by means of a total of four gear shifting elements G1 to G4 (i.e. dual synchronous clutches for example). The output gear wheels of wheel planes RE1 to RE8 forming the gear stages are all arranged on a common axially parallel output shaft 13. The output shaft 13 drives a drive shaft 19 of an axle differential 21 via a gear stage 14 with spur gear wheels 15, 17.

A respective first sub-transmission I and a second sub-transmission II of the dual clutch transmission 3 can be activated by means of the first and the second input shaft 7, 9. All odd forward gears 1, 3, 5, 7 are assigned to the first sub-transmission I, while all even forward gears 2, 4, 6 as well as one reverse gear R are assigned to the second sub-transmission II. Accordingly, the odd forward gears 1, 3, 5, 7 can be activated via the first input shaft 7 as well as via the first separating clutch K1. In contrast, the even forward gears 2, 4, 6 of the second sub-transmission II as well as the reverse gear thereof can be activated via the hollow second input shaft 9 as well as via the second separating clutch K2.

In FIG. 1, when sub-transmission II is in the intermediate position, the first sub-transmission I is spaced apart axially from the dual clutch K1, K2 when viewed in the axial direction, said dual clutch being arranged on the outer left transmission end in FIG. 1. The electric motor 5 is positioned on the opposite right axially external transmission end of the dual clutch transmission 3. An intermediate gear 11 for converting torque is upstream of the electric motor 5.

As further seen in FIG. 1, the first input shaft 7, when viewed in the axial direction, is extended beyond the first sub-transmission I with an end piece 23, on which an electromotive shaft 25 implemented as a hollow shaft is mounted coaxially. The electromotive hollow shaft 25 is connected to a rotor 29 of the electric motor 5 via a drive flange 27 in a rotationally fixed manner, said connection in turn acting with a stator 30 of the electric motor 5. In FIG. 1, the intermediate gear 11 of the electric motor 5 has a planetary gear unit 31, the sun gear 33 of which is arranged rotationally fixed on the electromotive hollow shaft 25. The radially external ring gear 35 is retained affixed to the housing, wherein a bar 37 supporting the planetary gears 39 can be coupled either to the first input shaft 7 (hereinafter designated also as an electric-motor-side input shaft) or to the output shaft 13 or can be decoupled from the dual clutch transmission 3 completely via an electric-motor-side shifting element S.

As seen in FIG. 1, the electric-motor-side shifting element S can be shifted from its neutral position N in the axial direction on both sides either into a first shifting position S1 or into a second shifting position S2 opposite thereto. When viewed in the axial direction, the electric-motor-side shifting element S is positioned between the intermediate gear 11 and a directly adjacent wheel plane RE8 (i.e. the electric-motor-side wheel plane), which forms the seventh gear stage in FIG. 1. The electric-motor-side wheel plane RE8 has a drive-side idler gear 41 mounted so as to pivot on the first input shaft 7, said idler gear engaging an output-side fixed gear 43 on the output shaft 13. For a conventional gear change, the idler gear 41 can be coupled to the electric-motor-side input shaft 7 by means of an assigned gear shifting element G4.

In a dual function with respect to such a conventional gear change, the idler gear 41 of electric-motor-side wheel plane RE8 is additionally also a component of an output-side electromotive connection to the output shaft 13. For such an electromotive connection to the output shaft 13, the electric-motor-side shifting element S is shifted into its second shifting position S2, in which the bar 37 of the planetary gear unit 31 of the intermediate gear 11 is coupled to the drive-side idler gear 41 of electric-motor-side wheel plane RE8.

Alternatively to this, in the first shifting position S1, the bar 37 of the planetary gear unit 31 of the intermediate gear 11 is coupled to the electric-motor-side input shaft 7, whereby a drive-side electromotive connection is provided to the electric-motor-side input shaft 7.

The above-defined gear-side and/or output-side electromotive connection (in shifting position S2 of the electric-motor-side shifting element S) has the following advantages: An optimum transmission ratio for recuperation is thus ensured (operating point of the electric motor 5 with respect to performance and efficiency over a large speed range). In addition, good efficiency is ensured for the recuperation (no drag losses of the separating clutches K1, K2 and the input shafts 7, 9 of the dual clutch transmission 3). Furthermore, a boost mode is ensured in a low torque end and an improvement of spontaneity during traction, even with traction downshifts or kickdown and repeated downshifts. In addition, a more energy-efficient driving mode is ensured with the gear-side electromotive connection, because transmission components not needed, such as oil pumps, control unit, transmission hydraulics, or shifting elements, can be deactivated (i.e. shifted without power). A further advantage of the above gearside electromotive connection is the continual availability of the electric motor 5; this means that the activation of the electric motor 5 is not bound to the current driving gear in the dual clutch transmission 3. In addition, there is no conflict when preselecting the gears (even if they are not shifted). The more-useable/available proportion of time of the drivetrain generator is thereby not limited. There is also little conflict with clutch adaptation; this means that the more-useable/available proportion of time of the drivetrain generator is not limited. Furthermore, there is no impact on clutch adaption (high inertia would make teaching of the kiss point of the clutch K1, K2 more difficult).

The above-defined drive-side electromotive connection (in the first shifting position S1 of the electric-motor-side shifting element S) has the following advantages: Thus, an electromotive driving mode is enabled with the drive-side electromotive connection (for example, parking pilot, traffic jam pilot, electric creep mode). In addition, a boost mode is ensured in the low torque end as well as an improvement in spontaneity during kickdown. Furthermore, an optimum transmission ratio is enabled for representing the driving functions (operating point of the electric motor 5 with respect to torque and performance at low driving speeds). In addition, a glide mode as well as an internal combustion engine start and an internal combustion engine pre-start as well as a cold start are enabled. In addition, support with the synchronization in the dual clutch transmission occurs with the drive-side electromotive connection. Moreover, several connection options are provided from the first input shaft 7 to the output shaft 13 (via 1st, 3rd, and 5th gear).

The decoupling of the electric motor 5 from the dual clutch transmission 3 (in the neutral position N of the electric-motor-side shifting element S) has the following advantages: Thus, the transmission ratio of the electromotive connection does not have to be configured based on the maximum rotational speed of the internal combustion engine 1 such that there is no excessive speed of the electric motor 5 (1st gear+gear spacing 1-2). Furthermore, the dual clutch transmission 3 can be operated with optimal efficiency, because there is no "braking" inertia in the operating states in which the vehicle is not using the electric motor 5 (highway, battery SOC maintain, cold, battery dead). In addition, the driving mode is energy-efficient because self-synchronization is not necessary. Furthermore, synchronization is relieved by decoupling the inertia when the electric motor 5 is not available (SOC maintain, battery dead, cold). Moreover, there is a shorter braking distance due to the decoupling of inertia with emergency braking as well as a relieving of the service brake by decoupling the electric motor inertia (battery fully charged, cold). The shifting capacity is also improved; this means that grinding of the gears when shifting is reduced and/or impeded after the free-flight phase.

Special operating modes, which can be implemented by means of the dual clutch transmission 3 shown in FIG. 1, are shown in the following:

Thus, with the transmission structure shown in FIG. 1, a recuperation/glide/boost mode is enabled in which the first input shaft 7 is completely decoupled from the driving mode, whereby drag losses are reduced. In this case, the electric-motor-side shifting element S is shifted into its second shifting position S2 (i.e. the gear-side and/or output-side electromotive connection). In boost mode, this results in a transmission of torque from the electric motor 5 via the electromotive shaft 25 thereof, the intermediate gear 11, as well as via the shifting element S shifted into the second shifting position S2 and the electric-motor-side wheel plane RE8 to the output shaft 13, and further via the gear stage 14 to the axle differential 21. In contrast, in recuperation mode, there is a reverse transfer of torque from the axle differential 21 to the electric motor 5. In glide mode, gear shifting elements G1 to G4 may optionally be in their neutral position. In addition, clutches K1, K2 may optionally be released and/or the internal combustion engine 1 may optionally be switched off.

In addition, a cold start and/or an internal combustion engine start can be implemented with the aid of the electric motor 5. In this case, the electric-motor-side shifting element S is shifted into its first shifting position S1, while all gear shifting elements G1 to G4 remain in their neutral position, and the first separating clutch K1, which is assigned to the first input shaft 7, is engaged. This results in a transmission of torque from the electric motor 5 via the electromotive shaft 25 thereof, the intermediate gear 11, as well as via the shifting element S, which is engaged in the first shifting position S1, into the electric-motor-side input shaft 7, further via the engaged separating clutch K1 and the internal combustion engine shaft 10 into the internal combustion engine 1. The above internal combustion engine start may optionally be combined with an electromotive driving mode, wherein, for example, wheel plane RE6, which forms the third gear, is additionally engaged.

Alternatively, there is a purely electromotive driving mode when the electric-motor-side shifting element S is shifted into its first shifting position S1 and, for example, wheel plane RE6, which forms the third gear stage, is engaged. In this configuration, the vehicle can also be operated in recuperation/glide/boost mode.

Figure 2:
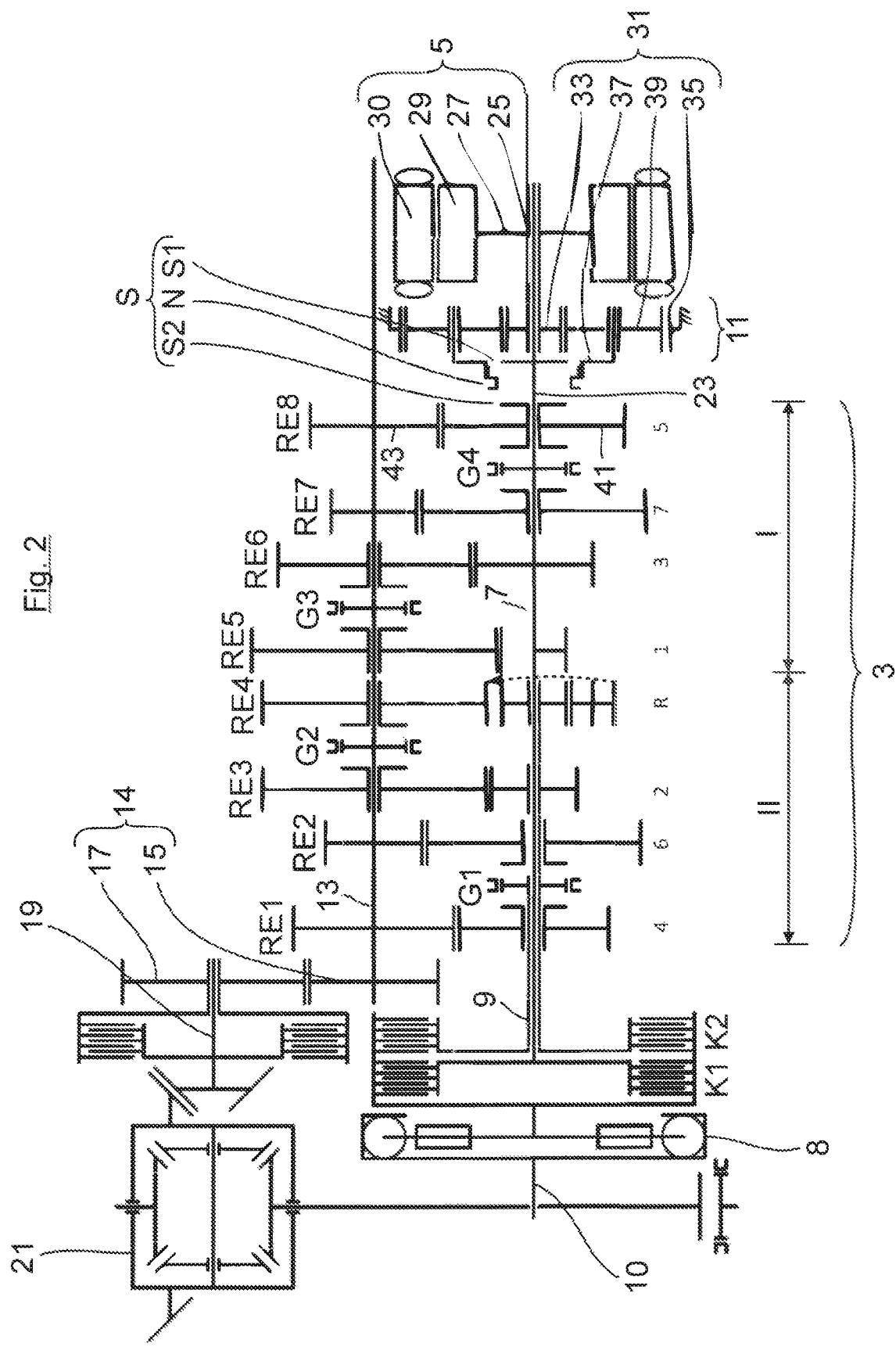
FIG. 2 a respective view in accordance with FIG. 1 according to further exemplary embodiment of the invention.

FIG. 2 shows a view in accordance with FIG. 1 of a second design variant, which is substantially identical to the transmission structure 1 shown in FIG. 1. In contrast to FIG. 1, electric-motor-side wheel plane RE8 in FIG. 2 does not form the seventh gear, but instead forms the fifth gear, while the seventh wheel plane RE7 forms the seventh gear. This means that in FIG. 2, the seventh and fifth gear stage are reversed in terms of position.

In the design variant shown in FIG. 3, the electromotive shaft 25—in contrast to FIG. 1—is no longer arranged coaxially on the electric-motor-side (i.e. first) input shaft 7, but instead is arranged axially parallel thereto on the common driveshaft 13. In addition, the planetary gear stage 31, which is a component of the intermediate gear 11, is located on the output shaft 13. The intermediate gear 11 in FIG. 3 additionally has a spur gear stage 45, the drive-side gear wheel 47 of which is mounted so as to pivot on the first input shaft 7 as an idler gear. The drive-side idler gear 47 can be coupled either to the electric-motor-side input shaft 7 (shifting position S1) or to the output shaft 13 (shifting position S2) by means of electric-motor-side shifting element S1. In FIG. 3, the bar 37 of the planetary gear stage 31 of the intermediate gear 11 is connected to an idler gear 49 of the spur gear stage 45 in a rotationally fixed manner, said idler gear being mounted coaxially on the output shaft 13.

In contrast to FIG. 3, the intermediate gear 11 in FIG. 4 is formed solely from the spur gear stage 45, i.e. without planetary gear stage 31. To this end, the spur gear stage 45, just as in FIG. 3, has the drive-side gear wheel 47, which is mounted so as to pivot on the first input shaft 7 as an idler gear. The drive-side idler gear 47 can be coupled either to the first input shaft 7 (shifting position S1) or to the output shaft 13 (shifting position S2) by means of electric-motor-side shifting element S. In contrast to FIG. 3 however, the output-side gear wheel 49 in FIG. 4 is arranged rotationally fixed on the electromotive shaft 25 as a fixed gear.

The invention claimed is:

1. A hybrid drivetrain for a hybrid-drive vehicle, comprising:
   an electric motor and an internal combustion engine, a force output shaft of the internal combustion engine alternatingly acting either on a first input shaft or on a coaxial second input shaft of a dual clutch transmission via two separating clutches of a dual clutch,
   wherein a respective first and second sub-transmission can be activated using the input shafts,
   wherein fixed and idler gears are arranged in wheel planes on the two input shafts and a common axially parallel output shaft, said fixed and idler gears being combined into gear sets which form gear stages in which the idler gears can be coupled to the shafts by gear shifting elements,
   wherein the electric motor optionally acts on one of the input shafts, designated as an electric-motor-side input shaft, via an intermediate gear,
   wherein an electric-motor-side shifting element is interposed between the electric motor and the electric-motor-side input shaft, said shifting element, in a first shifting position, coupling the electric motor to the electric-motor-side input shaft and, in a neutral position, decoupling the electric motor from the dual clutch transmission,
   wherein the electric-motor-side shifting element can be shifted into a second shifting position, in which the electric motor is coupled to the output shaft and decoupled from the electric-motor-side input shaft,
   wherein the electric-motor-side shifting element is arranged on the electric-motor-side input shaft, and in that the electric-motor-side shifting element can be shifted axially from a neutral position either in a first axial direction to a first shifting position or in a second axial direction, opposite to the first axial direction, to a second shifting position, and
   wherein an electric-motor-side wheel plane, which forms a gear stage, directly adjoins the electric-motor-side shifting element in the axial direction, said wheel plane having a drive-side idler gear mounted on the electric-motor-side input shaft, and in that, in the second shifting position, the idler gear of the electric-motor-side wheel plane is coupled to the electric motor in order to provide an electromotive connection to the output shaft.

2. The hybrid drivetrain according to claim 1, wherein the intermediate gear has a gear set separate from all the gear stages, particularly a planetary gear stage and/or a spur gear stage.

3. The hybrid drivetrain according to claim 1, wherein the drive-side idler gear of the electric-motor-side wheel plane can be coupled to the electric-motor-side input shaft by an assigned gear shifting element for changing gears.

4. The hybrid drivetrain according to claim 1, wherein the first sub-transmission and the second sub-transmission are arranged next to one another in the axial direction and in that, when the second sub-transmission is in an intermediate position, the first sub-transmission is spaced apart axially from the dual clutch, and
   wherein the electric-motor-side input shaft is a solid shaft, which is arranged coaxially within the second input shaft, which is formed as a hollow shaft.

5. The hybrid drivetrain according to claim 4, wherein the electric-motor-side input shaft is extended beyond the first sub-transmission with an end piece, on which the electric-motor-side shifting element is located, and in that the end piece is coupled to the electric motor in the first shifting position of the electric-motor-side shifting element.

6. The hybrid drivetrain according to claim 1, wherein the electric-motor-side shifting element is arranged in axial alignment between the electric-motor-side wheel plane external to the transmission in the axial direction and the intermediate gear of the electric motor, and
   wherein all wheel planes are arranged axially behind one another in the dual clutch transmission, and in that the dual clutch is arranged at an axially external transmission end and the electric motor is arranged at the axially opposite external transmission end.

7. The hybrid drivetrain according to claim 1, wherein the electric motor with an electromotive shaft is arranged coaxially with respect to the electric-motor-side input shaft or coaxially with respect to the output shaft.

8. The hybrid drivetrain according to claim 1, wherein the intermediate gear has a planetary gear stage with a sun gear as well as a radially external ring gear and intermediately arranged planetary gears.

9. The hybrid drivetrain according to claim 7, wherein the electromotive shaft is a hollow shaft, which is coaxially mounted on the electric-motor-side input shaft on an end piece thereof, or is coaxially mounted on the output shaft, and
   wherein a gear wheel of the intermediate gear is arranged on the electromotive shaft in a rotationally fixed manner.

10. The hybrid drivetrain according to claim 8, wherein the sun gear is arranged rotationally fixed on the electromotive shaft as well as the radially external ring gear is arranged affixed to the housing, and in that, in the first shifting position of the electric-motor-side shifting element, a bar supporting the planetary gears is coupled to the electric-motor-side input shaft, and in that, in the second shifting position of the electric-motor-side shifting element, the bar supporting the planetary gears is coupled to the drive-side idler gear of the electric-motor-side wheel plane.

11. The hybrid drivetrain according to claim 7, wherein the electromotive shaft is mounted coaxially on the output shaft, and in that the intermediate gear has a spur gear stage, a drive-side gear wheel of which is mounted on the electric-motor-side input shaft as an idler gear, and in that, in the first shifting position of the electric-motor-side shifting element, the drive-side idler gear of the spur gear stage is coupled to the electric-motor-side input shaft, and in that, in the second shifting position of the electric-motor-side shifting element, the drive-side idler gear of the spur gear stage is coupled to the drive-side idler gear of the electric-motor-side wheel plane.

12. The hybrid drivetrain according to claim 10, wherein the intermediate gear has both the spur gear stage and the planetary gear stage, and in that the bar of the planetary gears is connected to an output-side idler gear, mounted coaxially on the output shaft, of the spur gear stage, in a rotationally fixed manner.

13. The hybrid drivetrain according to claim 11, wherein the intermediate gear exclusively has the spur gear stage, an output-side gear wheel of which is arranged as a fixed gear on the electromotive shaft in a rotationally fixed manner.

14. The hybrid drivetrain according to claim 2, wherein the first sub-transmission and the second sub-transmission are arranged next to one another in the axial direction and in that, when the second sub-transmission is in an intermediate position, the first sub-transmission is spaced apart axially from the dual clutch, and wherein the electric-motor-side input shaft is a solid shaft, which is arranged coaxially within the second input shaft, which is formed as a hollow shaft.

15. The hybrid drivetrain according to claim 3, wherein the first sub-transmission and the second sub-transmission are arranged next to one another in the axial direction and in that, when the second sub-transmission is in an intermediate position, the first sub-transmission is spaced apart axially from the dual clutch, and wherein the electric-motor-side input shaft is a solid shaft, which is arranged coaxially within the second input shaft, which is formed as a hollow shaft.

\* \* \* \* \*